Aug. 9, 1966  
G. R. ASCHAUER  
METHOD OF OPERATING A COMBINED FLUID  
COUPLING AND FRICTION CLUTCH  
Filed July 27, 1964

INVENTOR.  
GEORGE R. ASCHAUER  
BY  
James E. Nilles  
ATTORNEY

INVENTOR.
GEORGE R. ASCHAUER
BY
James E. Nilles
ATTORNEY

United States Patent Office 3,265,169
Patented August 9, 1966

3,265,169
METHOD OF OPERATING A COMBINED FLUID COUPLING AND FRICTION CLUTCH
George R. Aschauer, Racine, Wis., assignor to Twin Disc Clutch Company, Racine, Wis., a corporation of Wisconsin
Filed July 27, 1964, Ser. No. 385,421
2 Claims. (Cl. 192—3.2)

The present invention relates generally to a combined fluid coupling and friction clutch and in particular, to a method of operation thereof.

The present invention provides an improved method of operating a combination fluid coupling and friction clutch, which method finds particular but not exclusive utility during that period in which the load is brought up to speed or accelerated from a starting condition, that is, during which the coupling and clutch are both operative to accelerate the load. The invention also finds considerable utility when driving a continuously slipping load. The arrangement is such that both the coupling and clutch can slip simultaneously, and both share in the heat developed or in the "heat burden" in such an operation.

The present invention provides a method of operating a combination coupling and clutch in which the coupling is purposely "undersized" and which will carry the full horsepower at stall conditions of the coupling. In other words, the present invention sizes the coupling so that when the coupling is at stall, it will allow the engine to run at full power and speed without lugging the engine down.

The present invention provides a method of operating a combined fluid coupling and friction clutch which comprises operating the fluid coupling with a high slip during an initial period of load acceleration, from substantially the point of stall of the coupling at full engine speed and horsepower, and then operating the friction clutch simultaneously with the operation of said coupling whereby both the coupling and clutch together accelerate the load. During the accelerating period both the coupling and clutch slip and the heat which is generated is shared by both.

The invention provides a method of operation of a combined fluid coupling and friction clutch which will protect the engine that drives the combination and allows the engine to develop its full horsepower but nevertheless provides a burn-out proof clutching system.

These and other objects and advantages of the present invention will appear as this disclosure progresses, reference being had to the accompanying drawings, in which.

Figure 1:
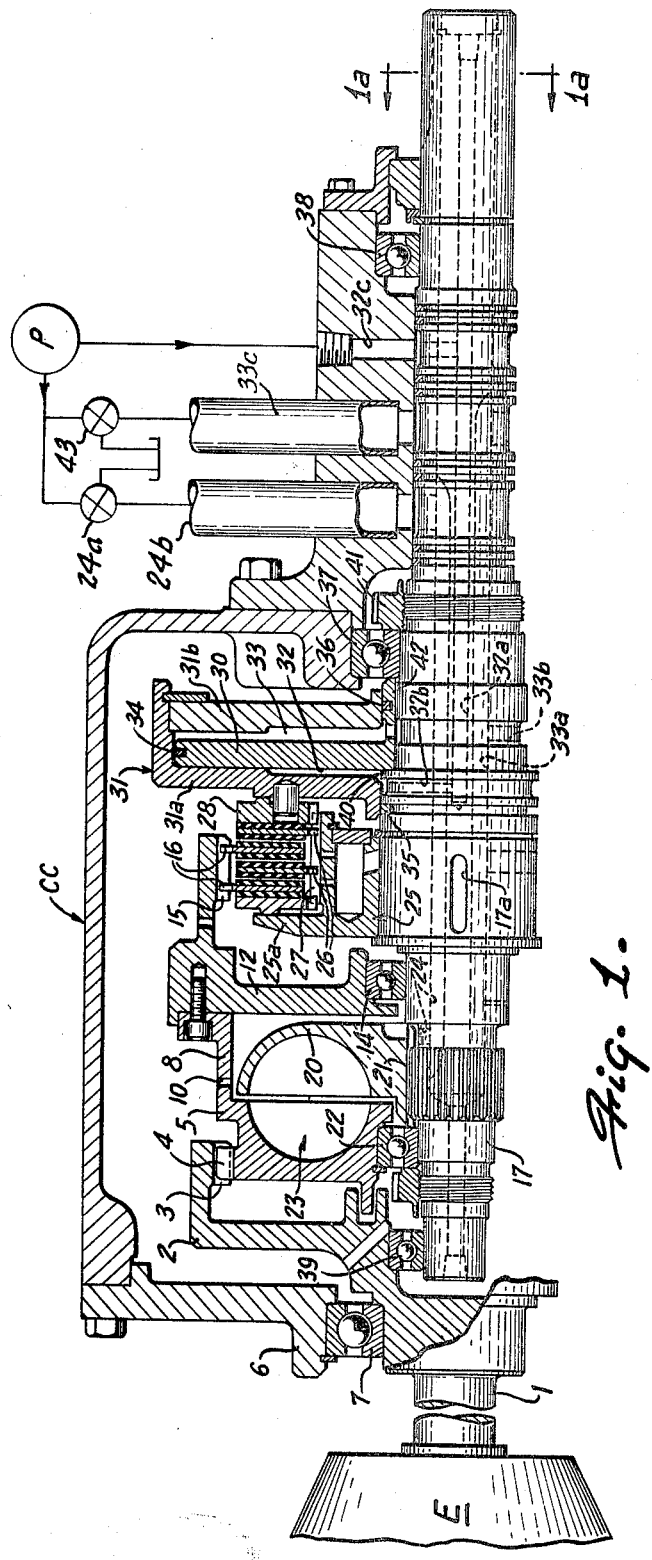
FIGURE 1 is a longitudinal, cross sectional view through a combined fluid coupling and friction clutch made in accordance with the present invention, the view showing a majority of the portion located below the longitudinal centerline as being broken away.
Figure 1A:
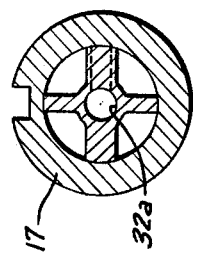
FIGURE 1a is a sectional view taken along line 1a—1a in FIGURE 1.

Referring in greater detail to the drawings, FIGURE 1 shows a combined fluid coupling and friction clutch CC which may be driven from an engine E, such as, for example, a gas turbine or diesel engine.

The driving unit of this combination includes a shaft 1 having an enlarged, cup-shaped end 2 with internal gear teeth 3 therein. External gear teeth 4 of an impeller 5 mesh with teeth 3 so that power is transmitted from the engine E to the impeller. This driving unit is journaled in the support frame 6 on anti-friction bearings 7.

The impeller has a cylindrical sleeve portion 8 through which extend the fluid discharge passages 10.

The driving unit also includes an inner radial wall 12 which is supported at its radially inner end by the anti-friction bearing assembly 14. The wall 12 has a series of internal splines 15 to which the friction plates 16 are fixed for rotation therewith but limited axial sliding thereon, in the conventional manner.

The driven unit includes shaft 17 on which the bearing assembly 14 is mounted, and this shaft has a turbine 20 connected to it by splines 21. The impeller is also rotationally supported on shaft 17 by bearing assembly 22. The impeller and turbine form a fluid coupling having a working chamber 23 for the working fluid. Fluid is introduced into the coupling in the conventional manner through a control valve 24a via the conduit 24b and passage 24. Thus, power can be transmitted from shaft 1 to shaft 17 through the fluid coupling.

A friction clutch hub 25 is fixed to shaft 17 by a conventional key 17a, and friction plates 26 are connected thereto by conventional splines 27. The interleaved plates 16 and 26 thus form a driving connection between shafts 1 and 17 when they are compressed sufficiently between the back-up portion 25a of the hub and the pressure ring 28 due to the axial thrust of the hydraulic clutch actuating means now to be described.

The hydraulic means for operating the friction clutch includes a reaction member 30 which is axially fixed on shaft 17, and an axially shiftable piston 31 which encloses member 30. Member 30 and piston 31 define a clutch engaging chamber 32 and clutch releasing chamber 33. Pressure fluid is admitted to the expansible chambers 32 and 33 respectively, through passages 32a, 32b, 32c, and passages 33a, 33b, and conduit 33c.

Piston 31 is of the annular housing type having opposite side walls 31a and 31b which are in sliding engagement with shaft 17. Suitable fluid seals 34, 35 and 36 are provided in accordance with conventional practice.

Shaft 17 is rotationally supported in frame 6 by anti-friction bearing assemblies 37 and 38 and is piloted at its end in cup 2 by the anti-friction bearing assembly 39.

Reaction member 30 is axially fixed on shaft 17 by shoulder 40 and lock nut 41 acting through bearing assembly 37 and against the long hub portion 42 of member 30.

When fluid is admitted by a conventional valve 43 from a fluid pressure source P via passages 32c, 32b, and 32a and into the clutch engaging chamber 32, the piston moves to the left as viewed in FIGURE 1, thereby compressing the clutch plates. The amount of pressure fluid which enters chamber 32 can be varied to thereby vary the clamping force on the plates and the degree to which the clutch is permitted to slip. Thus the clutching action can be modulated between slight engagement during which high slip and heat generation occurs, and full engagement at which time no slip or heat generation occurs.

The clutch is released when pressure fluid is released from chamber 32 by valve 43 and is applied to chamber 33 to cause the piston to be retracted.

With the present arrangement, the coupling may be actuated independently of the clutch, or both can be operated simultaneously to transmit power from the engine E, through shaft 17 and to the load (not shown) connected with shaft 17.

In accordance with the present invention, the coupling is purposely designed undersize so that it will carry the full horsepower at stall conditions of the coupling; that is to say, when the coupling is stalled, it will allow the engine to run at full power and speed without lugging it down. Under those circumstances of design, it is only when the coupling is combined with the friction clutch that it has any real usefulness or utility. Such a combination results in a compact and small overall design, protects the engine and allows it to develop full horsepower and has the ability to absorb the full power of the engine without burning out the clutch.

Figure 2:
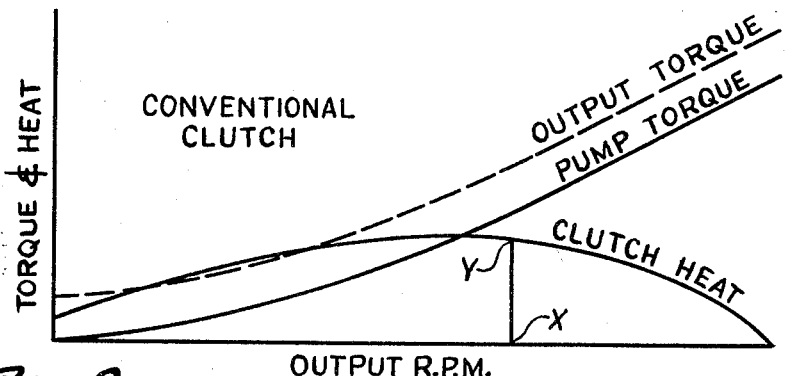
FIGURE 2 is a curve showing how much heat goes in a conventional friction clutch while it is driving a pump type load.
Figure 3:
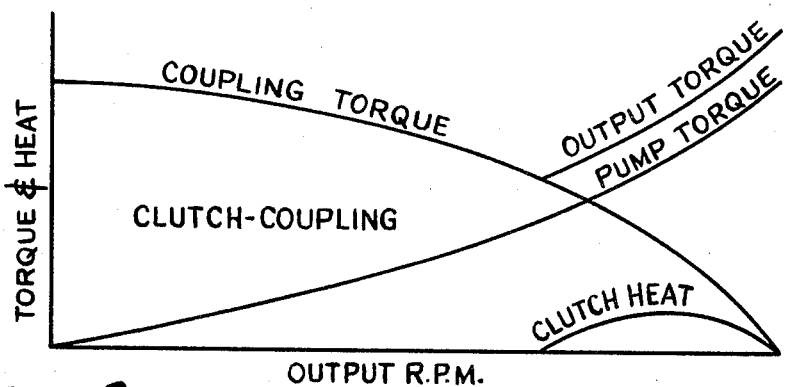
FIGURE 3 is a curve showing the energy absorption of the clutch of a clutch-coupling made in accordance with the present invention and while driving a pump type load.
Figure 4:
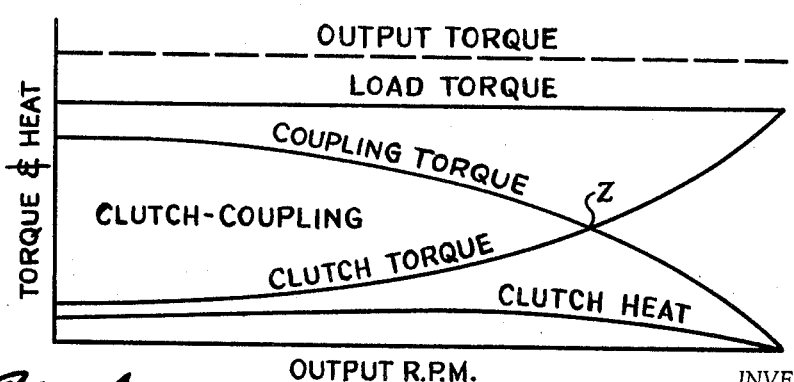
FIGURE 4 is a curve showing the heat absorbed by a clutch of a clutch-coupling made in accordance with the present invention, and when the clutch is engaged at zero output r.p.m., and accelerating a constant type load.

The curves shown in FIGURES 2, 3 and 4, are those showing potential overloading and overheating of a conventional clutch and of a combination clutch-coupling in accordance with the present invention when driving a pump type load and a constant load.

The curve shown in FIGURE 2 is that for a conventional friction clutch wherein the torque of and heat into the clutch are plotted against the output r.p.m. This curve illustrates such a clutch when accelerating a pump type load and shows how the heat then goes into the clutch. If the output speed is about two-thirds that of the input speed (as at point X), then the horsepower into the clutch, as illustrated at Y, is only fifteen percent of the engine rating, as long as a pumping type load is being driven (as opposed, for example, to driving other type loads, such as a flywheel). As shown in the FIGURE 2 curve, the output torque consists of the sum of the pump torque plus the acceleration torque. If the pump were suddenly accelerated, the clutch heat would rise to full engine horsepower, and in all probability, cause the clutch to burnout.

The curve shown in FIGURE 3 is that of a clutch-coupling made in accordance with the present invention when accelerating a pump type load; that is to say, it is a square load curve, the acceleration of a pump or propeller torque varies as the speed squared. In this case, the load can be accelerated only as fast as the coupling torque permits and it cannot overheat the clutch. It will be noted that the curve representing clutch heat shows the small amount of heat absorbed, and that the energy absorption of the clutch is radically reduced from that shown in FIGURE 1. The amount of cooling oil required in such a situation is correspondingly reduced. Here the difference between the output torque and the coupling torque is the clutch torque (not shown).

The curve shown in FIGURE 4 is that for a clutch coupling made in accordance with the present invention when accelerating a constant load, for example, that imposed on a tractor by a plow. In this case, the constant load torque is comprised of the clutch torque plus the coupling torque. If a clutch alone, or any comparable size, were used to transmit power in this situation, it would absorb the full engine horsepower and burnout.

The curve shown in FIGURE 4 demonstrates that in a clutch coupling combination made in accordance with the present invention when driving a constant load, the clutch can engage anywhere along the output speed line. In this situation the clutch and coupling are immediately started off together. In other words, the clutch is engaged at zero output r.p.m. and it will be seen that the heat absorbed into the clutch is not appreciable. Thus the clutch-coupling can absorb full engine horsepower at stall of the coupling without clutch burnout and it cannot pull down the engine as in the case of a standard fluid coupling. The most important function of the friction clutch is that it will give acceleration beyond the equilibrium or match point, that is, where the load and coupling torque match, as at Z.

By means of the present invention, a method of operation of a clutch-coupling has been provided to accommodate the full acceleration period, or a continuously slipping load, during which both the clutch and coupling may slip simultaneously and the heat burden is shared by both. The invention provides engine overload protection and absorption of full engine horsepower at stall of the coupling, without clutch burnout; it results in the ability to modulate constant torque load, and operate as an "either or'" system to use the clutch only for inching or manuevering; and a clutch coupling of much smaller dimension can be utilized then when using a clutch by itself, for comparable load situations.

Various modes of carrying out the invention are contemplated as being within the scope of the following claims particularly pointing out and distinctly claiming the subject matter which is regarded as the invention.

I claim:

1. A method of providing an accelerating and driving torque from an engine to a load comprising the steps of connecting a fluid coupling and a friction clutch for operation in parallel between said engine and load, operating the fluid coupling from substantially the point of stall of the coupling at full engine speed and horsepower to begin driving the load, then operating the friction clutch to drive the load simultaneously with the coupling, and permitting both the coupling and clutch to slip in driving the load and sharing the heat generated during such acceleration.

2. The method as recited in claim 1 including the step of fully engaging the friction clutch to drive the load by itself after said load has been accelerated.

References Cited by the Examiner

UNITED STATES PATENTS 3,189,144   6/1965   Gabriel _____ 192—3.2

DAVID J. WILLIAMOWSKY, *Primary Examiner.*

A. T. McKEON, *Assistant Examiner.*